United States Patent [19]

Toda et al.

[11] Patent Number: 5,240,531
[45] Date of Patent: Aug. 31, 1993

[54] ENDLESS BELT

[75] Inventors: Naoki Toda, Tokyo; Katuo Akimoto, Yashio; Takashi Taruki, Yokohama; Goro Mori, Tokyo, all of Japan

[73] Assignees: Ricoh Company, Ltd.; Nitto Kogyo Co., Ltd., both of Tokyo, Japan

[21] Appl. No.: 424,872

[22] Filed: Oct. 20, 1989

[30] Foreign Application Priority Data

Oct. 26, 1988 [JP]  Japan .............................. 63-139759[U]
Jun. 19, 1989 [JP]  Japan .................................. 1-156552

[51] Int. Cl.$^5$ ............................................ B29D 17/00
[52] U.S. Cl. ..................................... 156/137; 156/293; 156/294; 156/308.2; 198/844.2; 198/847; 428/36.1; 428/246; 428/250; 428/296; 428/260; 428/263
[58] Field of Search ............................ 198/847, 844.2; 428/36.1, 246, 250, 296, 260, 263; 156/137, 293, 294, 308.2

[56] References Cited

U.S. PATENT DOCUMENTS

| 4,150,581 | 4/1979 | Walten ................................. 428/254 |
| 4,572,359 | 2/1926 | Fujita et al. ......................... 198/847 |
| 5,164,237 | 11/1992 | Kaneda et al. ..................... 428/36.1 |

FOREIGN PATENT DOCUMENTS 1556300 2/1970 Fed. Rep. of Germany .
3204983 8/1983 Fed. Rep. of Germany .

Primary Examiner—James J. Bell
Attorney, Agent, or Firm—Oblon, Spivak, McClelland, Maier & Neustadt

[57] ABSTRACT

An endless conveyor belt that has a nonexpansible and noncontractive core member and an elastic laminate layer bonded to one of the core surfaces. The core member and the laminate layer are preformed as an endless belt, respectively, and bonded together to constitute an endless conveyor belt. The conveyor belt is used for conveying an original paper to a predetermined position on a contact glass where the original paper is operated a predetermined treatment. The conveyor belt is assembled within an ADF in cooperation with belt rollers to rotary drive the conveyor belt. The belt is formed by a method that includes: a core belt forming process in which an endless core belt is formed from a nonexpansible and noncontractive material; a laminate layer forming process in which a laminate layer in a form of an endless belt is formed from an elastic thermoplastic material; and a bonding process in which the laminate layer is bonded to at least one of the surfaces of the endless core belt.

8 Claims, 6 Drawing Sheets

ENDLESS BELT

BACKGROUND OF THE INVENTION

The present invention relates to an endless belt. More particularly, it relates to a method of producing an original paper conveyor belt and an automatic original paper feeding apparatus (automatic document feeder (ADF)) equipped with the same belt, applied to an apparatus such as a copying machine or a recording apparatus.

The automatic original paper feeding apparatus (automatic document feeder (ADF)) equipped in a copying machine, for example, is provided with an original paper conveying belt which conveys an original paper placed thereon with the image surface side to be copied facing downward to the belt surface to a predetermined position on a contact glass. Such a conveyor belt is wound around and spanning between a pair of belt rollers that drive the belt to convey the original paper from the paper feed portion to the exposure position on the contact glass. The conveyor belt stops when the original paper comes to the exposure position where the original paper is exposed and scanned. After the exposure of the original paper, the conveyor belt is again driven to discharge the original paper from the exposure position on the contact glass. When both surface sides of the original paper are to be copied, the original paper is reversed and reconveyed to the contact glass after one surface side is copied.

The conventional original paper conveying belt comprises an endless belt having a white colored outer surface side made of sole rubber material on which the original paper is placed. The conveyor belt may be constructed as an elastic coreless belt or comprise a nonelastic core belt layer made from a woven cloth or yarn.

With regard to the coreless belt made from sole rubber material, the belt is relatively easy to produce. However, with regard to the endless belt having a core layer, the belt is produced by such a way that, first an elastic layer is coated on an endless core material, then the elastic layer is dried and the coating step and the drying step are repeated to obtain a predetermined thickness of the elastic layer of the belt.

The coreless rubber belt is economical but easily damaged since the durability thereof is low due to low hardness of the rubber. Besides, the belt has to be relatively thick to strengthen the belt, which makes the belt heavy and increases the load of the belt drive system.

On the other hand, with regard to the conventional complex belt having a core layer, the belt is strengthened by the core without increasing the weight thereof. However, the conventional belt has seam lines on the outer surface thereof. The belt is soiled with dirt along the seam lines. The soiled line is copied on the copying paper, which degrades the quality of the copy. Also, the seam portion is weak so that the belt is apt to be torn from and along the seam line. Further, the seam line periodically creates a noise at the time when the seam line passes the member which is in contact with the conveyor belt.

In order to obviate the problems mentioned above, various techniques for producing a seamless belt having a core have been proposed. However, proposed techniques are not satisfactory as described below.

The endless belt with core layer is manufactured by coating an elastic resin material such as rubber on the surface of endless core member. The elastic coating layer needs a predetermined thickness. Therefore, the coating step for coating the elastic material on the core and the drying step for drying the elastic material have to be repeated three to five times to reach the aimed thickness, which requires a long time to manufacture the belt and impairs the productivity thereof. More precisely, the thickness of the coating layer at one time is about 0.05 mm to 0.1 mm while the required thickness of the elastic layer of the belt is about 0.2 mm to 0.25 mm, which requires several repetitions of the coating and drying steps. It takes about twenty four hours for drying the coating layer in one drying step. Therefore, it takes about one week for manufacturing one conveyor belt repeating the coating and drying of the elastic layer, which lowers the efficiency of mass production of the conveyor belt. Also, in the drying process, dust in the air is apt to attach to the surface of the liquid coating layer, which impairs the outer view of the belt and increases the ratio of defective products.

Generally, soil or stain on the conveyor belt is cleaned by using a specific solvent such as alcohol. However, with regard to the conventional coating type conveyor belt having a core layer mentioned above, the soil or stain is not completely removed but spread entirely over the belt surface instead, which impedes the reuse of the conveyor belt. The cause of this unremovable soil or stain is supposed that a solvent used in the coating step sputters on the belt surface and makes a porous surface there in which dirt or soil is permeated and enclosed unsweepably.

On the other hand, conventionally, a complex sheet member comprising a nonexpansible core member and an elastic laminate layer is developed. However, technique to constitute an endless conveyor belt made from such a complex member has not been developed yet.

SUMMARY OF THE INVENTION

It is therefore an object of the present invention to provide an endless belt and a method of producing the original paper conveyor belt having a core layer as well as an automatic original paper feeding apparatus (automatic document feeder) using the same belt which does not impair the quality of the copy or the outer view of the belt and makes it possible to increase the productivity thereof.

A primary feature of the present invention is that a core member and a laminate layer member are prefabricated in a form of endless belt, and after that these prefabricated members are combined and bonded together to constitute an endless belt having a core therein.

A manufacturing process of the original paper conveying belt in accordance with the present invention comprises an endless core forming process wherein the endless core is formed from a nonexpansible and noncontractive core material having a predetermined width; a laminate layer forming process wherein an endless laminate belt is formed from an elastic and thermoplastic material; and a bonding process wherein the laminate layer is sticked to at least one of the surface sides of the endless core member.

An automatic original paper feeding apparatus (automatic document feeder) in accordance with the present invention is provided with a conveyor belt comprising: an endless core belt made from a nonexpansible and noncontractive material; and a laminate layer in the form of an elastic endless belt sticked to the original paper conveying side surface of the core belt.

Also, another automatic original paper feeding apparatus (automatic document feeder) in accordance with the present invention comprises: a core member in the form of endless belt made from a nonexpansible and noncontractive material; a coating layer formed on the belt roller contact surface side of the core member by applying a liquefied elastic material on the core belt surface and drying it; and a laminate layer formed at least on the paper conveying surface side of the core member by sticking a thin elastic endless belt.

In accordance with the present invention, the original paper conveyor belt is manufactured by forming a nonexpansible and noncontractive endless core belt having a predetermined width and sticking a thin elastic endless sheet-like laminate layer to the core belt. The conveyor belt manufactured through the above-mentioned steps is wound around and spanning between a pair of belt rollers and used in such a way that an original paper is conveyed by the laminate layer surface which faces to the contact glass.

Advantages of the above-mentioned method of producing the original paper conveying belt are that the producing period of time is shortened in comparison to the conventional conveyor belt having a coating layer in the paper conveying surface side thereof, since the laminate layer having an even surface is disposed in the original paper conveying surface side of the belt, which makes it possible to reduce the cost of the belt and that the seam is deleted from the belt which realizes a dust-free surface and upgrades the outer view and commercial image thereof in the market.

Also, advantages of the above-mentioned automatic original paper feeding apparatus (automatic document feeder) of the present invention are that the cost of the apparatus is lowered since it uses the inexpensive conveyor belt mentioned above and that high quality copy can be obtained since the original paper conveyor belt has no seam to which dust and soil are apt to attach.

Also, since the laminate layer is made from a high density material, the belt surface can be cleanly swept by alcohol or other cleaning solvent, which makes it possible to use the belt for a long time by cleaning the belt surface.

Further objects and advantages of the present invention will be apparent from the following description of the preferred embodiments of the invention as illustrated in the accompanying drawings.

DESCRIPTION OF THE PREFERRED EMBODIMENTS

Figure 1:
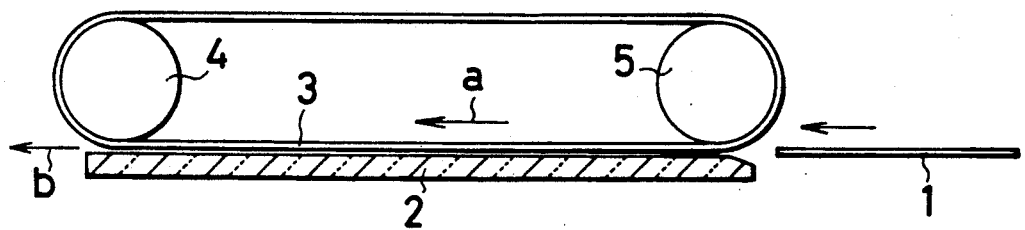
FIG. 1 is a constructional view of a main portion of an embodiment of the automatic original paper feeding apparatus (automatic document feeder) in accordance with the present invention.

With reference to FIG. 1, an automatic original paper feeding apparatus (automatic document feeder) comprises an original paper conveyor belt 3 which conveys an original paper 1 to be copied to a predetermined position on a contact glass 2 of a copying apparatus, as shown by an arrow a. The original paper 1 is disposed in such a manner that the side to be copied faces downward to contact glass 2. The conveyor belt 3 is wound around and spanning between a pair of belt rollers 4 and 5 so that it conveys the original paper 1 from an original paper feed portion to an exposure position on the contact glass where the belt stops and the original paper is exposed and scanned in the state that the original paper is stationary. After the exposure operation, the conveyor belt 3 is again driven to discharge the original paper 1 from the contact glass 2 as shown by an arrow b.

Figure 2:
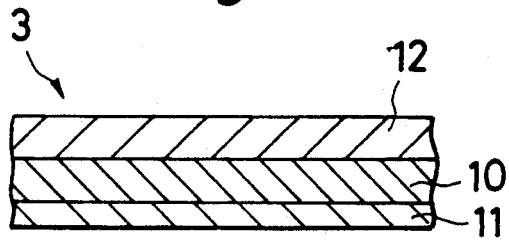
FIG. 2 is a sectional view of an example of the original paper conveying belt in accordance with the present invention.

With reference to FIG. 2, structure of the original paper conveying belt 3 is explained hereinafter. Numeral 10 designates an endless core member made from a nonexpansible material such as vinylon, polyester or cotton. The endless core member 10 is formed as an endless belt. The seam portion of this endless core member 10 is required to be flat without forming a step.

Figure 3:
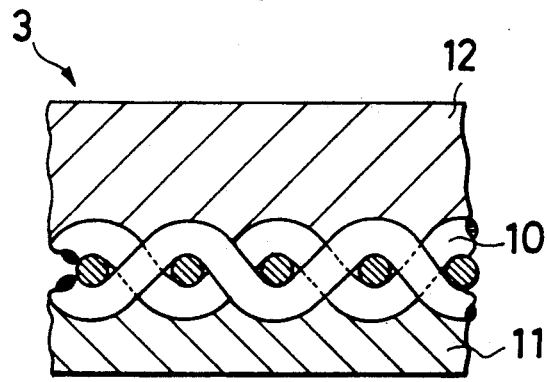
FIG. 3 is an enlarged sectional view of a part of the belt of FIG. 2.

The endless core member 10 may be made either from a woven cloth as illustrated in the enlarged view of FIG. 3, or non-woven cloth. When a non-woven cloth is to be used, the cloth is required to have a characteristic that makes it possible to combine the coating layer and the laminate layer together as described later. On the belt surface, that comes in contact with the belt rollers 4, 5, of the endless core member 10, i.e., on the inner surface side of the endless core member 10, is formed a coating layer 11 so as to prevent the core member from fraying and to obtain a predetermined frictional force between the belt rollers 4 and 5. The coating layer 11 is made by applying, for example, a liquefied polyurethane rubber to the core belt surface evenly up to a predetermined thickness and drying the liquefied rubber. It is sufficient to conduct the coating step one time to get the predetermined required thickness.

If dust is attached on the uncured coating layer surface in the drying process, that does not impair the outer view of the conveyor belt since the coating layer surface is the hidden inner side of the belt to come in contact with the belt rollers.

On the other side surface of the endless core member 10, i.e., on the outer side surface which comes in contact with the original paper and conveys the paper, is disposed an elastic endless laminate layer 12 which is colored white or yellow and 0.2 mm to 0.25 mm thick. The endless laminate layer 12 is either formed by overlapping and pasting an elastic sheet-like member or made from a short cylindrical tube member. When the sheet-like laminate layer 12 is pasted onto the endless core member 10, it is important to make the seam portion even and flat without forming a gap or step. With respect to the short cylindrical tube member, there is no seam portion so that no problem arises concerning the dust or soil attaching along the seam line.

Figure 12:
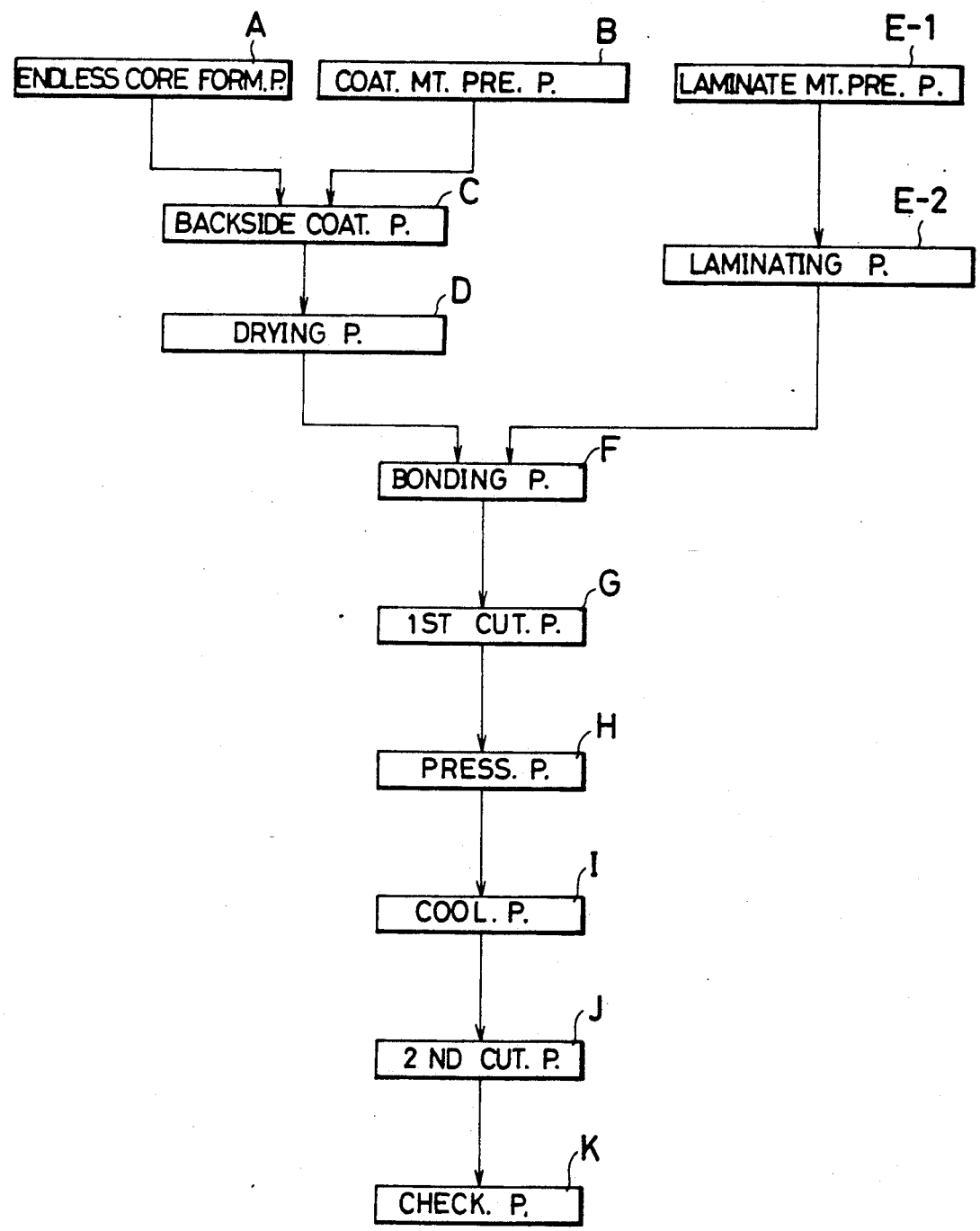
FIG. 12 is a flow chart of the process for producing the original paper conveyor belt in accordance with the present invention.

A method of producing the above-mentioned original paper conveying belt is described in detail hereinafter with reference to FIG. 12.

(A) Endless Core Member Forming Process

This process is to form an endless core member 10 including a web of hollow weave made from vinylon, polyester, cotton or blended yarn fabric of these materials. The core member 10 may have a seam. However, there must not be a step or gap at the seam portion. The endless core member 10 has a predetermined standardized thickness and width. The core member 10 may be an endless core member made from a woven fabric composed of only a warp thread (parallel to the direction of conveyance).

(B) Coating Material Preparation Process

Also, a coating solution for forming the coating layer 11 is prepared. The coating solution has a liquefied elastic material such as polyurethane rubber and a compounding ingredient such as coloring agent. The coating solution is accurately checked on the viscosity and the color depth thereof and evenly stirred.

(C) Backside Coating Process

Figure 5:
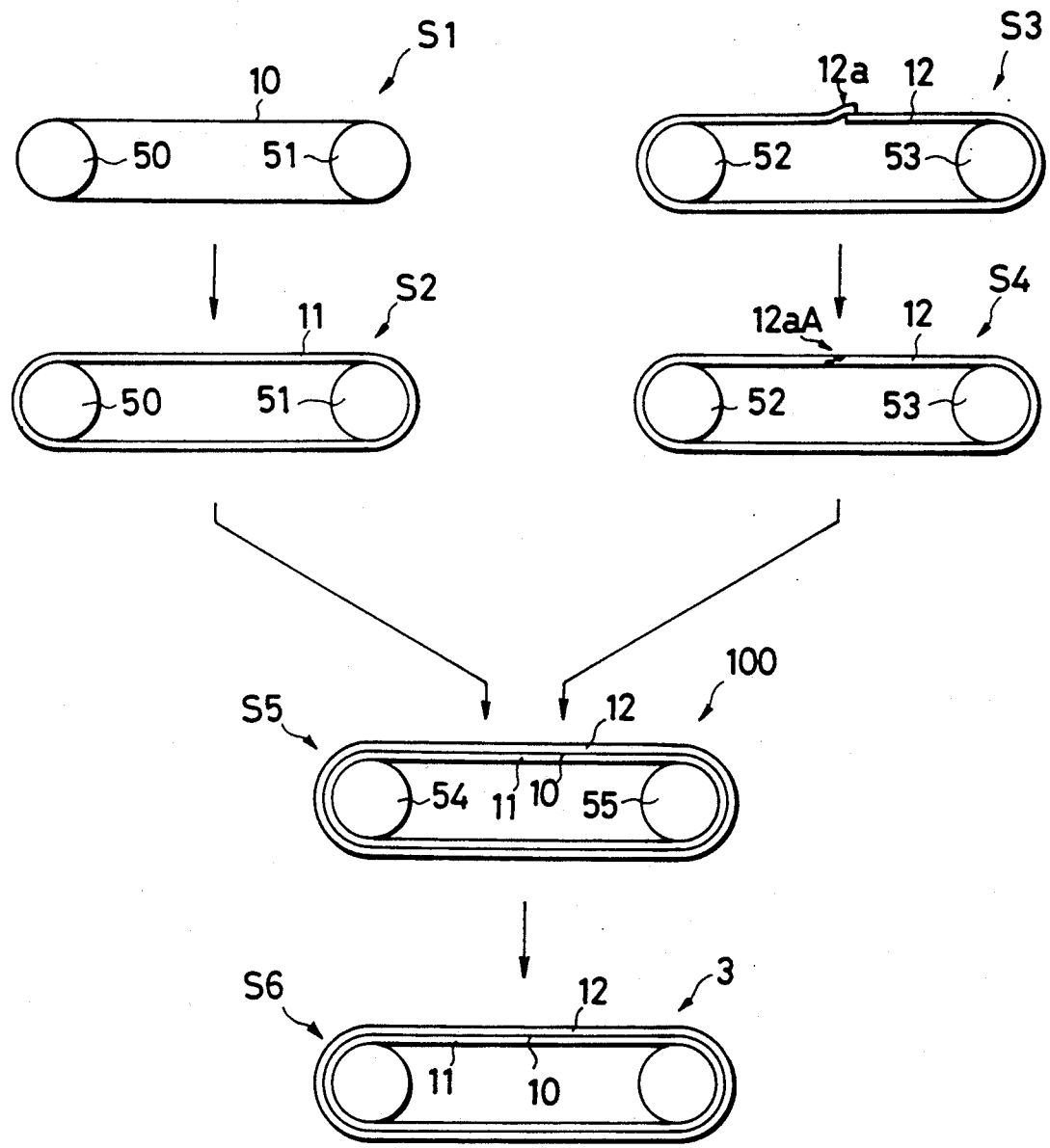
FIG. 5 is a flow chart of producing the original paper conveyor belt in accordance with the present invention.

This process is to form a coating layer 11 on the backside surface (inner side surface that comes in contact with the belt rollers) of the endless core member 10. In FIG. 5, step S1 designates a state wherein an endless core member 10 is wound around and spanning between a pair of rollers 50, 51. In step S2 of FIG. 5, the coating layer 11 is formed on one side surface of the core member 10 (which surface is disposed backside of the conveyor belt when the conveyor belt is completed).

Figure 8A:
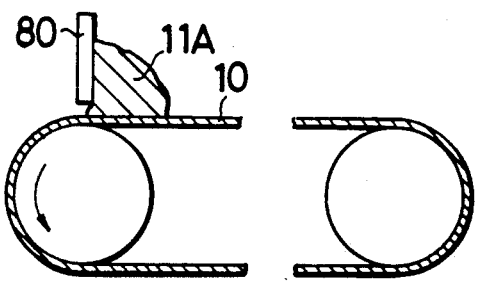
FIGS. 8a to 8c are explanatory views of the endless core belt and the coating layer, representing different steps in sequence in the coating process in accordance with an example of the present invention.
Figure 8B:
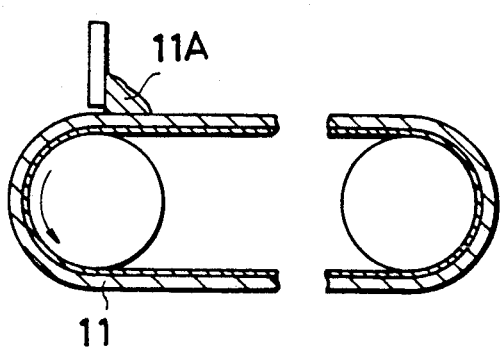
Figure 8C:
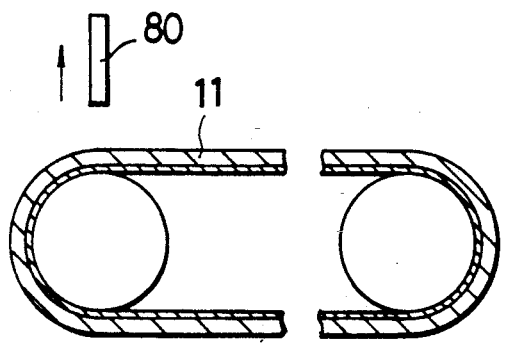

The coating layer 11 is formed in such a way as illustrated in FIGS. 8a to 8c, for instance. First, a doctor blade 80 is arranged to come close to the endless core member 10 which is rotated by the rollers and a predetermined amount of coating material 11A such as polyurethane rubber is applied to the belt surface, as depicted in FIG. 8a.

As the endless core member 10 is rotated, the coating material 11A is evenly dispersed and coated on the core belt surface by the doctor blade 80 which is held at a predetermined distance constantly from the core belt surface so as to even the thickness of the coating layer 11, as illustrated in FIG. 8b. The thickness of the coating layer 11 is 0.05 mm to 0.1 mm.

After that, as illustrated in FIG. 8c, the doctor blade 80 is lifted up so that the belt element is removed from the pair of rollers. It is sufficient to conduct the coating process one time since the primary purpose of arranging the coating layer 11 is to prevent the core member 10, especially side edges thereof, from fraying.

Figure 7A:
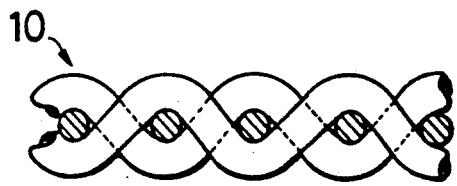
FIGS. 7a and 7b are explanatory sectional views of the core member and the coating layer of the conveyor belt, representing different steps in the coating process, respectively.
Figure 7B:
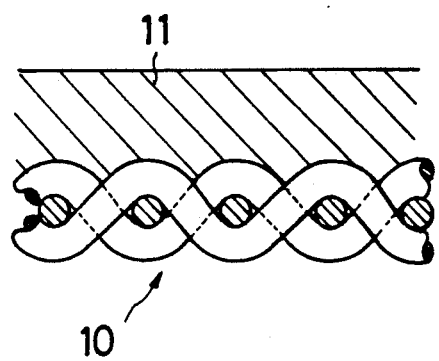

FIGS. 7a and 7b are explanatory sectional views of the core member 10 and the coating layer 11 of the conveyor belt, representing different steps in the coating process, respectively.

The belt element comprises, as illustrated in the enlarged view of FIG. 7b, the endless core member 10 having the coating layer 11 attached on one side thereof. The coating layer 11 and the core member 10 are superimposed and come in contact together. In this state, the coating layer in excess is cut. It is to be noted that the coating layer 11 in this stage does not penetrate into the space between the core belt fibers.

(D) Drying Process

This process is to dry the coating layer 11 formed on the belt element removed from the rollers by leaving the belt element in an atmosphere of room temperature or heated atmosphere. When drying in the room temperature, it is sufficient to leave the belt element in the atmosphere for about twenty four hours to dry the coating layer.

(E) Laminate Layer Forming Process

This process is to form an endless laminate layer and comprises a laminate material preparation step (E-1) and a lamination step (E-2). This process is conducted independently from the above-mentioned endless core member forming process and the coating material preparation process.

In the laminate material preparation step, viscosity and color tone of polyurethane rubber as a base of elastic material and compounding ingredient such as coloring agent are checked. After that, the components are mixed in the most suitable ratio and stirred. The elastic material is not limited to polyurethane rubber. It may be any other elastic material of high density composition which impedes impregnation of alcohol or other cleaning solutions.

In the lamination step, a predetermined amount of laminate material is supplied to form an endless belt. The laminate material is supplied in the form of sheet or strip and wound around and spanning between the rollers 52 and 53 to form an endless belt. The amount of the laminate material corresponds to the size of the laminate layer which is determined by its length corresponding to the span between the belt rollers 4 and 5 (see FIG. 1), its width corresponding to the width of the endless core member 10 and a predetermined thickness thereof (for example 0.2 mm to 0.25 mm).

In FIG. 5, step S3 represents a state wherein a thin strip like laminate layer 12 is wound around and spanning between the rollers 52 and 53. In this state, a seam 12a is projected from the laminate layer surface. The endless belt-like laminate layer 12 can be formed by a tube method or an inflation method wherein the laminate layer is formed as a short cylindrical ring to have predetermined length from the initial state thereof. The laminate layer 12 can also be formed by overlapping and jointing both ends of a sheet-like laminate film made by a T-die method or a calender method. In this case, a seam 12a is formed along the joint portion.

Figure 6A:
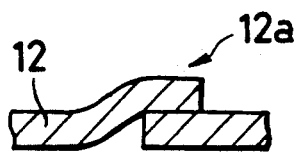
FIGS. 6a to 6d are sectional views of a seam portion of the laminate layer, representing different producing steps thereof in sequence, respectively.
Figure 6B:
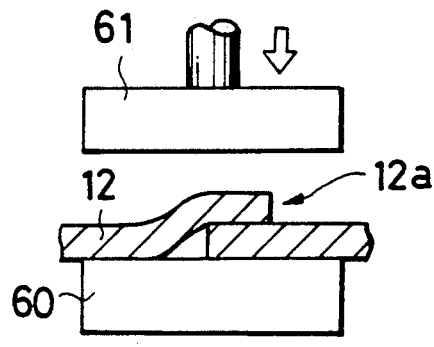
Figure 6C:
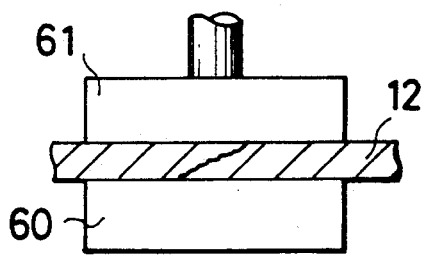
Figure 6D:
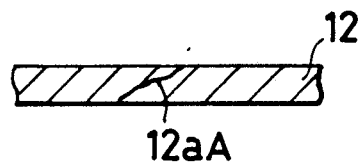

The seam 12a is deleted by such a way as illustrated in FIGS. 6a to 6d. FIG. 6a illustrates a seam 12a which is formed by overlapping the ends of the laminate layer 12 by 2 mm to 3 mm. The laminate layer 12 is placed on a table 60, as illustrated in FIG. 6b, where the seam 12a of the laminate layer 12 is heated and pressed by a press 61. The press 61 is moved down to a position where the distance between the press and the table 60 is equal to the thickness of the laminate layer 12 (0.2 mm to 0.25 mm), as illustrated in FIG. 6(c). By this pressing operation, the material in excess of overlapping portion of the seam 12a is pushed toward the lateral sides of the laminate layer in the direction perpendicular to the drawing so that a flat and even jointing portion 12aA is obtained, as illustrated in FIG. 6d and step S4 of FIG. 5. The material in excess pushed outward in the lateral sides is cut away by an appropriate means.

(F) Bonding Process

After the seam 12a is deleted, the laminate layer 12 is superimposed on the endless core member 10 which is reversed so that the coating layer 11 is disposed inner side of the core belt to come in contact with the rollers 54 and 55, as illustrated in step S5 of FIG. 5. The assembly of the endless belts having the core member 10, the coating layer 11 and the laminate layer 12 is treated as a belt element 100 and processed further in the subsequent steps.

(G) First Cutting Process

Figure 9A:
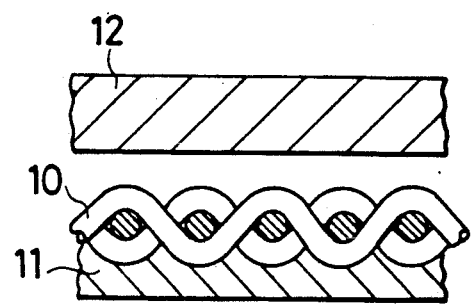
FIGS. 9a and 9b are enlarged sectional views of the conveyor belt of the present invention for explaining the bonding process of the laminate layer and the core belt, representing different steps in sequence in the bonding process, respectively.

The belt element comprises, as illustrated in the enlarged view of FIG. 9a, the endless core member 10 having the coating layer 11 attached on one side thereof and the laminate layer 12 superimposed on the opposite side of the core belt member. The laminate layer 12 is placed upon the non-coating side of the endless core member 10. In this state, the laminate layer in excess is cut. It is to be noted that the laminate layer 12 in this stage does not penetrate into the space between the core belt fibers.

(H) Pressing Process

In this process, the laminate layer 11 and the core member 10 of the belt element 100 are bonded together. Two examples of method for bonding the laminate layer and the core belt are described hereinafter with reference to FIGS. 10 and 11.

Figure 9B:
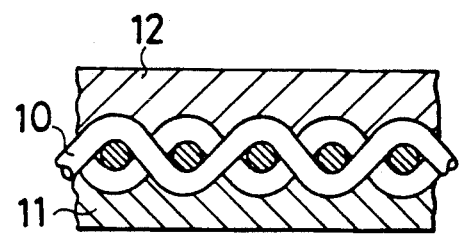
Figure 10:
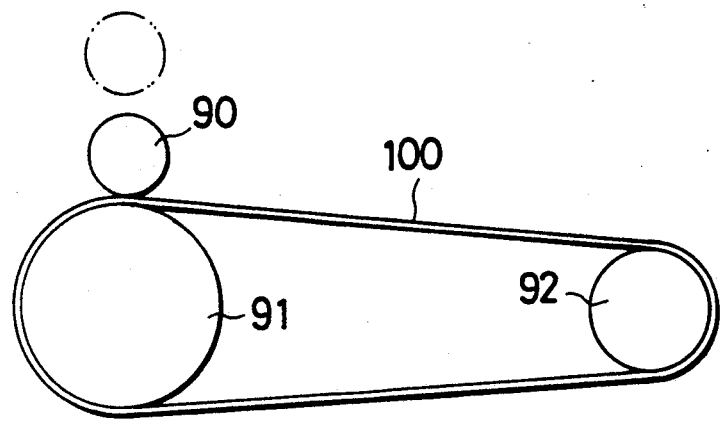
FIG. 10 is an explanatory view for explaining an example of a method for carrying out the bonding process in accordance with the present invention.

In FIG. 10, the belt element 100 is wound around and spanning between two rollers 91 and 92. A roller 90 is disposed on the roller 91 so as to press the belt element 100 against the roller 91 at this position. The roller 90 houses a heat source therein. Outer surface of the roller 91 is treated to prevent the melted coating material from attaching to the surface. By driving the rollers to rotate the belt element 100, the laminate layer 12 is heated to melt and bonded to the core member 10 (see FIG. 9b).

Figure 11:
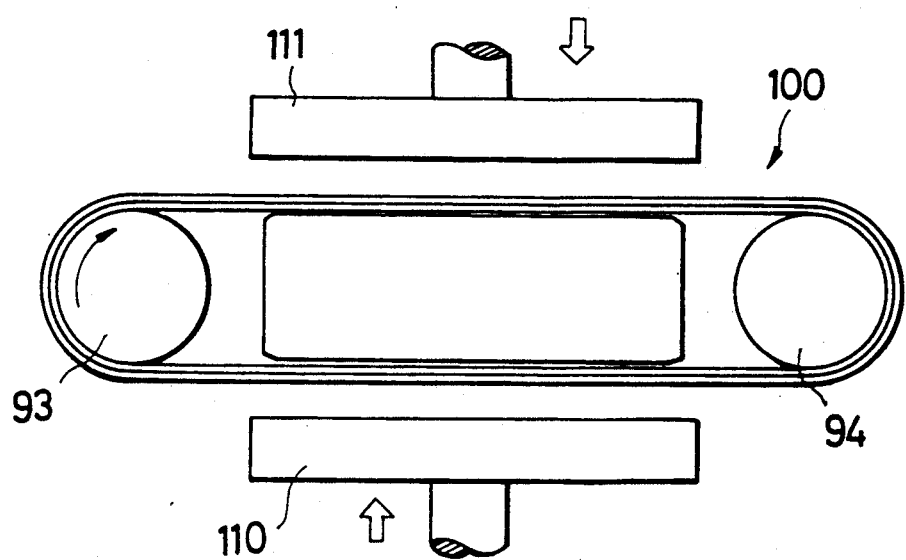
FIG. 11 is an explanatory view for explaining another example of a method for carrying out the bonding process in accordance with the present invention.

In FIG. 11, the belt element 100 is wound around and spanning between two rollers 93 and 94. The over path portion (upper belt portion) and under path portion (lower belt portion) of the belt 100 are heated and pressed by an upper presser 111 and a lower presser 110, respectively, to melt and bond the laminate layer 12 and the core member 10 together, as illustrated in FIG. 9b. After one pressing operation, the pressers 110 and 111 are moved away from the belt 100 which is rotated again to move a predetermined length for the subsequent pressing operation. By repeating the pressing operation, the laminate layer 12 and the core member 10 are bonded together along the entire length of the belt element 100.

In either of the rolling method of FIG. 10 and the pressing method of FIG. 11, the laminate layer 12 penetrates into the space between the fibers of the endless core member 10 and fills the uneven surface thereof, as illustrated in FIG. 9b, so that the bondage strength is heightened. Also, even if the laminate layer 12 is slightly irregular with respect to the thickness thereof, such an irregularity is absorbed by the uneven surface of the core belt so that the thickness of the belt becomes even along the entire length of the belt.

(I) Cooling Process

In FIG. 10, after the laminate layer is bonded, the roller 90 is moved away from the belt element 100, as illustrated by a dash-dot line, so as to cool down the belt 100 (which has a structure as the original paper conveying belt at this stage), by leaving the belt 100 in the atmosphere.

(J) Second Cutting Process

After the belt element 100 is cooled down, both of the lateral sides of the belt are trimmed by cutting away the material in excess projecting outward from the lateral sides of the belt so that the width of the belt becomes evenly a predetermined value along the entire length thereof.

This cutting process may be carried out either in the state that the belt element is wound around the belt rollers 54 and 55 or in the state that the belt element is removed out of the rollers.

(K) Inspection Process

This process is to inspect the width, thickness, length and outer view of the belt element 100 which is processed through the above-mentioned steps. When the belt element has passed inspection, the belt element 100 is completed as an original paper conveyor belt 3, as illustrated in step S6 of FIG. 5.

The original paper conveyor belt 3 having the sectional structure as described above is arranged to be wound around and spanning between the belt rollers 4 and 5, as illustrated in FIG. 1, in such a way that the coating layer 11 is disposed inside of the belt and comes in contact with the belt rollers 4 and 5 while the laminate layer 12 is disposed outside of the belt and carries the original paper on the surface thereof.

Figure 4:
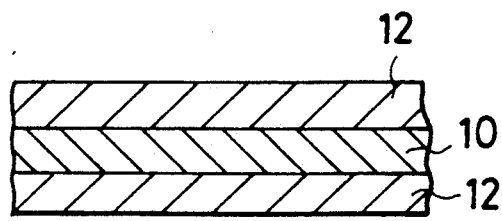
FIG. 4 is a sectional view of another example of the original paper conveying belt in accordance with the present invention.

FIG. 4 illustrates another example of the original paper conveyor belt structure wherein the endless core member 10 has laminate layers 12 and 12 formed on both sides thereof. This structure is made by such a way that, first, the laminate layers 12 and 12 are superimposed on both sides of the endless core member 10, after that each laminate layer 12 is bonded to the core member 10 with the use of the device illustrated in FIG. 10 or FIG. 11.

In accordance with the structure of FIG. 4, it becomes possible to delete the coating process so that the time period for drying the coating layer can be deleted, which makes it possible to heighten the productivity of the belt and lower the cost thereof as well as to realize a conveyor belt of long life since both sides of the belt can be used as the original paper conveyor surface.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of producing an original paper conveyor belt for use in a copying machine, recording apparatus or the like, the conveyor belt having a shape of an endless belt, said producing method comprising the steps of:

preparing an endless core member made of a substantially nonexpansible material and having a predetermined width;

preparing an elastic thermoplastic material in a sheet-like shape;

overlapping both end portions of said elastic thermoplastic material;

joining said overlapped both end portions of said elastic thermoplastic material by pressing said overlapped both end portions while heating said overlapped both end portions, to thereby form a laminate layer having an endless belt-like shape and a flat seam portion;

forming a coating layer on an outer circumferential surface of said core member to thereby prevent said core member from fraying;

reversing said core member so that said formed coating layer is arranged on an inner side of said core member;

superposing said laminate layer on an outer circumferential surface of said reversed core member, thereby forming an endless belt-like assembly; and pressing said endless belt-like assembly while heating said endless belt-like assembly, thereby bonding said superposed laminate layer onto said outer circumferential surface of said endless belt-like assembly.

2. A method of producing an original paper conveyor belt according to claim 1, wherein said coating layer forming step comprises the steps of:

winding said core member around a pair of rollers such that said core member is spanned between said pair of rollers; and forming a coating layer on an outer circumferential surface of said spanned core member.

3. A method of producing an original paper conveyor belt according to claim 2, wherein said core member reversing step comprises the steps of:

removing said core member having said formed coating layer from said pair of rollers;

reversing said removed core member such that said formed coating layer is arranged on an inner side of said core member; and winding said reversed core member around said pair of rollers such that said reversed core member is spanned between the pair of rollers.

4. A method of producing an original paper conveyor belt according to claim 3, wherein said laminate layer superposing step is performed in a state where said reversed core member is spanned between said pair of rollers, and said endless belt-like assembly pressing step is performed in a state where said endless belt-like assembly is spanned between said pair of rollers.

5. A method of producing an original paper conveyor belt for use in a copying machine, recording apparatus or the like, the conveyor belt having a shape of an endless belt, said producing method comprising the steps of:

preparing an endless core member made of a substantially nonexpansible material and having a predetermined width;

extruding an elastic thermoplastic material into a cylindrical shape;

cutting said extruded elastic thermoplastic material having said cylindrical shape to thereby form a laminate layer having an endless belt-like shape and said predetermined width;

forming a coating layer on an outer circumferential surface of said core member to thereby prevent said core member from fraying;

reversing said core member so that said formed coating layer is arranged on an inner side of said core member;

superposing said laminate layer on an outer circumferential surface of said reversed core member, thereby forming an endless belt-like assembly; and pressing said endless belt-like assembly while heating said endless belt-like assembly, thereby bonding said superposed laminate layer onto said outer circumferential surface of said endless belt-like assembly.

6. A method of producing an original paper conveyor belt according to claim 5, wherein said coating layer forming step comprises the steps of:

winding said core member around a pair of rollers such that said core member is spanned between said pair of rollers; and forming a coating layer on an outer circumferential surface of said spanned core member.

7. A method of producing an original paper conveyor belt according to claim 6, wherein said core member reversing step comprises the steps of:

removing said core member having said formed coating layer from said pair of rollers;

reversing said removed core member such that said formed coating layer is arranged on an inner side of said core member; and winding said reversed core member around said pair of rollers such that said reversed core member is spanned between the pair of rollers.

8. A method of producing an original paper conveyor belt according to claim 7, wherein said laminate layer superposing step is performed in a state where said reversed core member is spanned between said pair of rollers, and said endless belt-like assembly pressing step is performed in a state where said endless belt-like assembly is spanned between said pair of rollers.

* * * * *